Jan. 29, 1929.                            1,700,643
C. NORDELL
ACCELERATOR
Filed Dec. 14, 1927
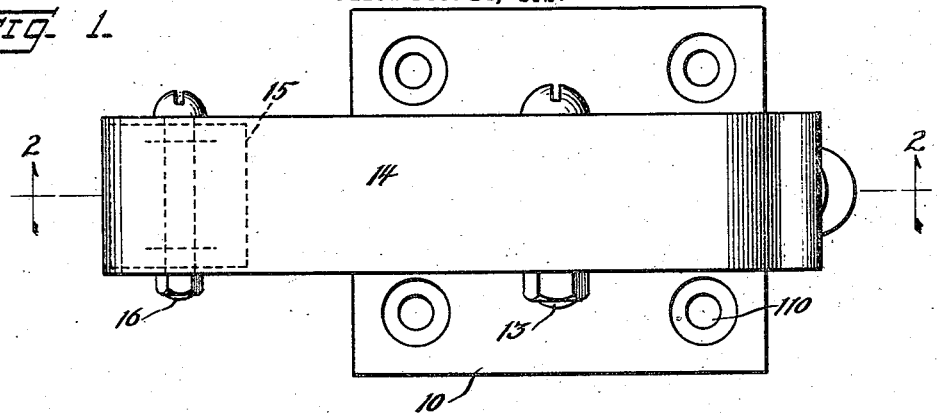
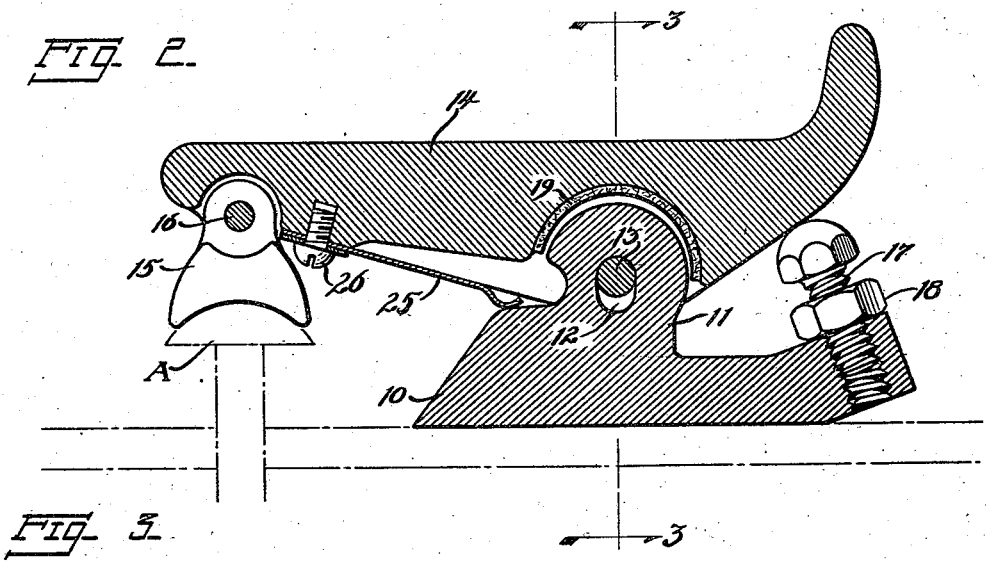
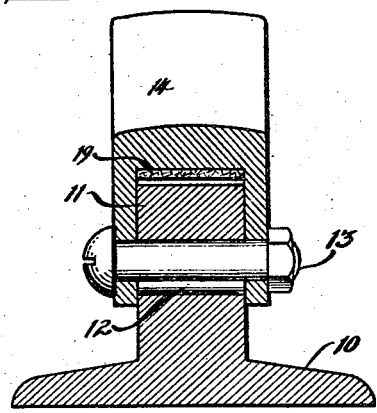
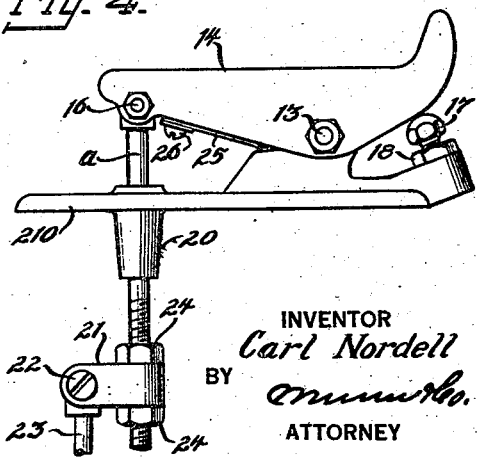
INVENTOR
Carl Nordell
BY
ATTORNEY Patented Jan. 29, 1929.

1,700,643

UNITED STATES PATENT OFFICE.

CARL NORDELL, OF GILBERTVILLE, MASSACHUSETTS.

ACCELERATOR.

Application filed December 14, 1927. Serial No. 240,002.

My invention relates to a means for operating the accelerator of an automobile to control the throttle.

The general object of my invention is to provide a practical and novel device for the indicated purpose which will be effective for its purpose and convenient of operation.

The nature of my invention and its distinguishing features and advantages will clearly appear as the description proceeds.

Reference is to be had to the accompanying drawings forming part of this specification, it being understood that the drawings are merely illustrative of examples of the invention.

Figure 1 is a plan view of a device for operating an accelerator and embodying my invention;

Figure 2 is a longitudinal vertical section as indicated by the line 2—2 of Figure 1;

Figure 3 is a cross section as indicated by the line 3—3 of Figure 2;

Figure 4 is a side elevation illustrating another form of the invention adapted for embodiment in an automobile when manufactured instead of constituting an attachment to an automobile, as in the case of the form shown in Figures 1 and 2.

In carrying out my invention in the form shown in Figures 1, 2 and 3 which is adapted to be emplaced in an automobile by the owner, the numeral 10 indicates the base which may be of any approved design, and having means such as screw holes 110 to receive fastening screws for securing the device in position on the floor of an automobile.

The base 10 is formed with a lug 11 in which is a vertical oblong slot 12 through which passes a pivot bolt 13 which rockably secures a pedal 14. Depending from the pedal 14 at one end is a pressure head 15 secured by a pivot bolt 16 to said pedal 14.

To limit the rocking movement of the pedal 14 after the depression thereof I provide a stop screw 17 adjustable in the base 10 to vary the movement permitted the pedal 14 in rising after a depression. Said stop screw 17 is held in adjusted position by a set nut 18.

The top surface of the lug 11 is rounded and the opposed rounded surface of the pedal 14 on the underside has friction material 19, such as brake lining material or the like.

The pedal 14 is permitted a vertical bodily movement so that without any appreciable rocking thereof the pedal may be moved up or down owing to the slot 12 and pivot bolt 13, so that the friction material 19 will bind against the upper surfaces of the lug 11 and prevent accidental depression of the pressure head 15 until such depression of said pressure head is effected deliberately.

In use foot pressure applied to pedal 14 can be so distributed on said pedal as to cause a depression of the pressure head 15 by rocking movement of said pedal about the axis of the bolt 13.

The pressure head 15, when the device is in the form of an attachment to an automobile, bears against the usual accelerator button A to depress the accelerator for throwing open the throttle valve in the usual manner.

To cause the pedal 14 to be restored to its normal position after depression I provide lift spring 25 secured by bolt 26 or the like to the under side of the pedal 14, the free end of the spring bearing against the base 10 in a manner tending to lift the pedal.

The form shown in Figure 4 is adapted to be incorporated in an automobile when made at the factory. In said figure those parts corresponding with the first described construction bear the same refeernce letters as in Figures 1 to 3. The base 210 in Figure 4 is adapted to be made rigid in any suitable manner with the floor of an automobile, and is formed with sleeve 20 through which accelerator spindle $a$ extends from the pivot bolt 16. The said accelerator spindle $a$ has secured thereto in the present instance a clip or clevis 21 through which passes a bolt 22 and from bolt 22 extends any suitable connection 23 to the throttle valve, not shown. The numeral 24 indicates set nuts to hold the clevis 21 in adjusted position.

I would state furthermore that while the illustrated examples constitute practical embodiments of my invention, I do not limit myself to the exact details herein illustrated, since, manifestly, the same can be considerably varied without departure from the spirit of the invention as defined in the appended claim.

I claim:

An accelerator, including a base, a pedal rockably mounted on said base, and a member on said pedal adapted to engage the accelerating means of an automobile, the pivot means being capable of bodily movement to permit vertical movement of the pedal toward or from the base, the pedal and base persenting opposed surfaces adapted to contact when the pedal is bodily depressed, one of said surfaces having friction material thereon.

Signed at Ware, in the county of Hampshire, and State of Massachusetts this 10th day of December, A. D. 1927.

CARL NORDELL.